Feb. 14, 1928.
E. J. BRENNAN
1,658,791
AUTOMATIC CRANK PIN LUBRICATOR
Filed April 24, 1926
2 Sheets-Sheet 1
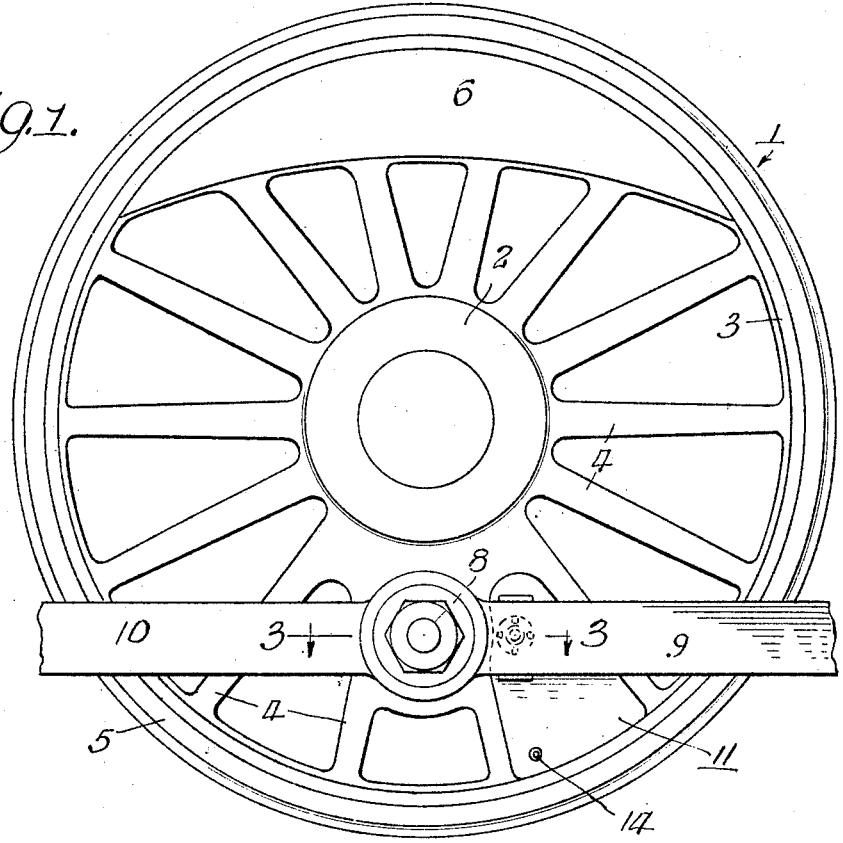
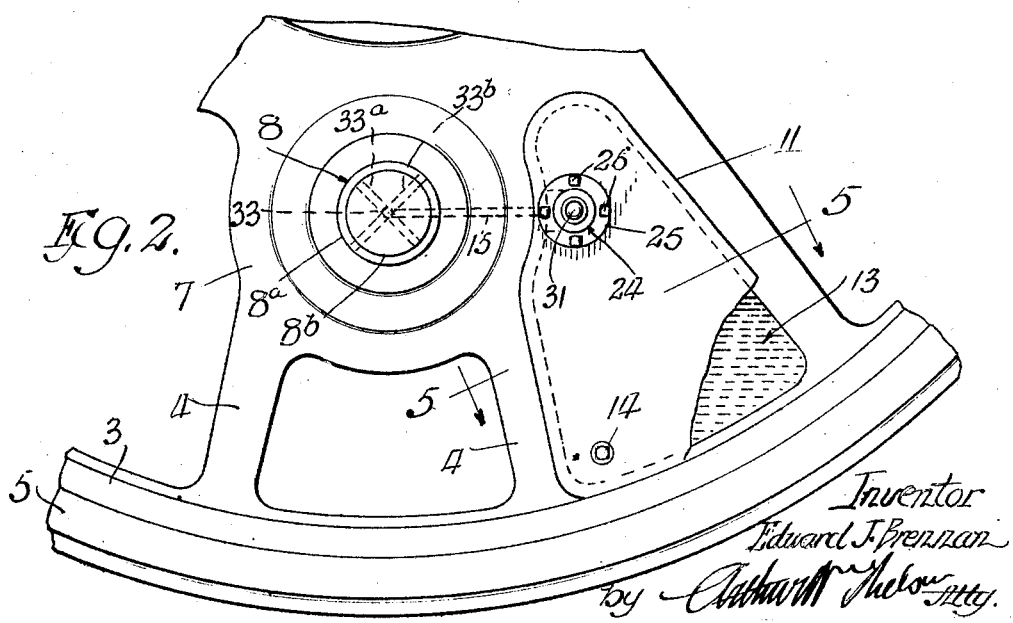
Inventor
Edward J. Brennan
by Arthur M. Nielow Atty.

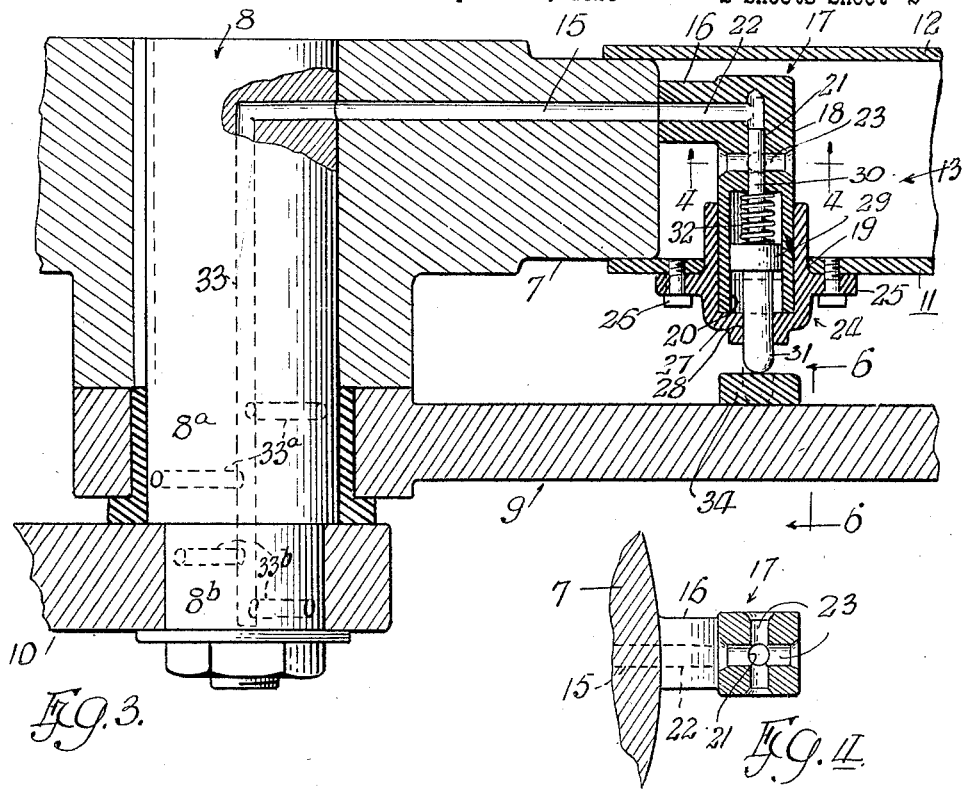
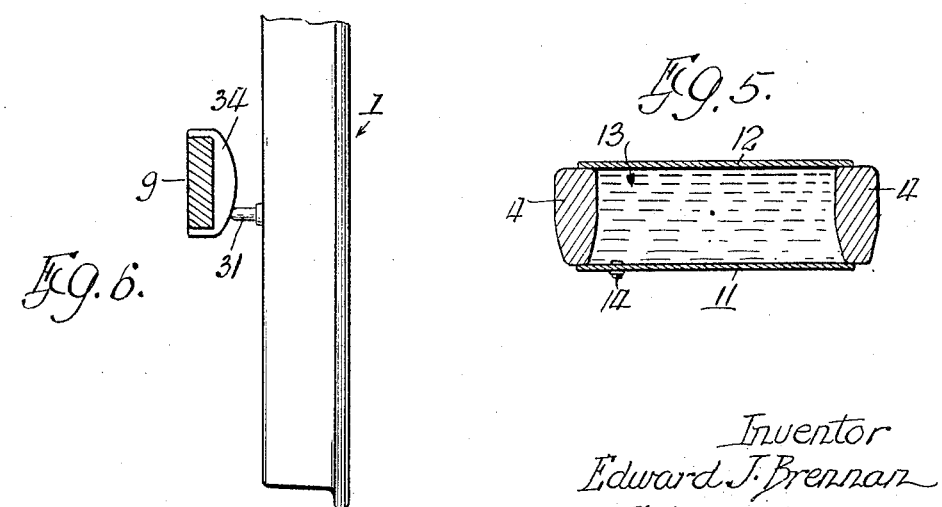

Patented Feb. 14, 1928.

1,658,791

UNITED STATES PATENT OFFICE.

EDWARD J. BRENNAN, OF OELWEIN, IOWA.

AUTOMATIC CRANK-PIN LUBRICATOR.

Application filed April 24, 1926. Serial No. 104,428.

This invention relates to automatic crank pin lubricators and it consists of the matters hereinafter described and more particularly pointed out in the appended claims.

The primary object of the invention is to provide a simple and efficient means for automatically supplying under pressure, small amounts of lubricant at the desired intervals, to the periphery of the crank pin, as for instance on a locomotive drive wheel, to which the usual rods associated therewith are journalled.

A further object of the invention is to provide a device to furnish a lubricant to the crank pin bearing uniformly and economically and this without the requirement of attention by an operator.

Another object of the invention is to provide a structure of the kind wherein, the necessity of drilling the main or side rods for lubricating passages and grease cups, which materially weakens said rods, is eliminated.

Still another object of the invention is to form the wheel by which the crank pin is carried with a lubricant supply compartment and to force feed a small quantity therefrom to the crank pin for lubricating purposes, at the desired intervals of time.

These objects of the invention, as well as others, together with the many advantages thereof will more fully appear as I proceed with my specification.

In the drawings:—

Fig. 1 is a view in elevation of one of the drive wheels of a locomotive, embodying my improved crank pin lubricator.

Fig. 2 is a fragmentary view on an enlarged scale of parts shown at the bottom end of Fig. 1.

Fig. 3 is a horizontal sectional view on a further enlarged scale as taken on the line 3—3 of Fig. 1.

Fig. 4 is a detail sectional view as taken on the line 4—4 of Fig. 3.

Fig. 5 is a sectional view as taken on the line 5—5 of Fig. 2.

Fig. 6 is a vertical sectional view through one of the side rods as taken on the line 6—6 of Fig. 3, with the associated wheel shown in elevation.

I have illustrated and will describe the invention as embodied in one of the drive wheels of a locomotive, but this is not intended as by way of a limitation, because as will be apparent, the invention may be embodied in other structures where its peculiar characteristics makes it of advantage to do so.

Referring now in detail to that embodiment of the invention illustrated in the accompanying drawings:—1 indicates as a whole one of the drive wheels of a locomotive which includes a hub 2, a rim 3 and radial spokes 4 connecting said hub and rim. To the rim is fixed the usual tire 5. On one part of the wheel, a counter weight 6 is provided and diametrically opposite the same is formed a boss 7 merging into the hub and in which a crank pin 8 is fixed in any suitable manner. Said crank pin as herein shown is of the "stepped" kind and on the inner part $8^a$ of larger diameter thereof is journalled the bearing end of one of the side rods 9 and on the outer part $8^b$ of smaller diameter thereof is journalled the bearing end of the main rod 10. The bearings of said rods on said crank pin are only generally illustrated and described herein, because they vary in different types of locomotives. (See Fig. 3.)

The space between two of the spokes 4—4 adjacent the boss 7, is enclosed by front and rear plates 11 and 12 respectively which are welded at their margins to said spokes, boss and rim to provide a lubricant chamber or compartment 13. In the front plate near the rim is an opening normally closed by a plug 14 whereby the said compartment may be filled with a lubricant, preferably a soft grease.

In the crank pin boss is formed a transverse passageway 15 and the said boss within the compartment 13 is welded the short leg 16 of an L shaped fitting 17. (See Fig. 3). The long leg 18 of said fitting, which is preferably but not necessarily square in cross section, extends parallel with the crank pin and is of such length as to project through an enlarged circular hole 19 in the front plate 12. In the outer end of the fitting leg 18 is formed a circular plunger recess 20 with which connects a coaxial passageway 21. Said passageway 21 in turn connects with a similar passageway 22 in the shorter leg of the fitting which opens into the passageway 15 in the boss 7. In said leg 18 between the plunger recess 20 and the passageway 22 are a plurality of cross ports 23 each of which communicates at its inner end with the passageway 21 and each being enlarged at its outer end as best shown in Fig. 3.

In the opening 19 in the front plate 11 is mounted a plunger guide casting 24 which includes a radial flange 25 to receive bolts 26 for securing the casting to the plate 11. Said casting is provided with a rectangular bore to receive the outer ends of the long leg 18 of the fitting 17 and its front end is formed by a wall 27 having an opening 28 therein. In the recess 20 of the fitting 17 is a piston or plunger 29 having stems 30 and 31 respectively at each end. The stem 31 extends into the passageway 21 of the fitting while the other stem projects through the opening 28 in the front end wall of the casting, the extreme outer end of the last mentioned stem being rounded as shown in Fig. 3. A spring 32 surrounds the stem 30, between the inner end of the recess 20 and the plunger to normally urge the plunger as a whole, outwardly.

In the crank pin 8 is an axially disposed passageway 33 which is closed at its outer end and at its inner end is in communication with the passageway 15 in the crank pin boss 7.

In the portions $8^a$ and $8^b$ of the crank pin, are radially disposed but offset ports $33^a$ and $33^b$ respectively which communicate at their inner ends with the passageway 33 in the crank pin and at their outer ends open through the peripheries of the associated parts of the crank pin.

On the inner surface of the side rod 9 is formed a cam like projection 34 which in the operation of the locomotive, is adapted to engage or wipe against the outer rounded end of the plunger stem 31.

During the revolutions of the wheel 1, grease will be forced through the ports 23 of the fitting 17 and into the passageway 21, the end of the inner stem 30 of the plunger, normally uncovering said ports. During each revolution of the wheel, the projection 34 on the side rod will engage the end of the outer stem 31 of the plunger and will force it inwardly against the action of the spring 32, the end of the inner stem moving past the ports 23 and forcing the small amount of lubricant admitted to the passageway 21 rearwardly as best shown in Fig. 3. In time the passages 21 and 22 as well as those in the crank pin will be filled with grease so that each time the wheel revolves, a small amount of grease is forced out through the ports $33^a$—$33^b$ to lubricate the bearing sleeves of the main and side rods.

After the projection 34 on the side rod has passed the plunger stem, said stem is returned to its normal outward position under the action of the spring 32.

It is to be noted that the casting 24 may be removed for inspection of the plunger and other interior parts without disturbing the L shaped fitting.

My invention is simple in construction and is positive in operation and can be readily applied to locomotives already in service. It force feeds a small quantity of lubricant for each rotation of the wheel and needs no attention except to see that the compartment 13 has a proper supply of lubricant therein.

While in describing my invention, I have referred to many details of construction as well as form and arrangement of parts thereof, I do not wish to be limited thereto except as may be pointed out in the appended claims.

I claim as my invention:—

1. In combination with a wheel, a lubricant reservoir and a crank pin carried by said wheel, there being a conduit connecting said reservoir and crank pin, force feeding means positioned in said reservoir and including a plunger arranged parallel with the crank pin, and means for automatically actuating the plunger to force lubricant from the reservoir to the crank pin.

2. In combination with a wheel, a lubricant reservoir and a crank pin carried by said wheel, there being a conduit connecting said reservoir and crank pin, force feeding means positioned in said reservoir and including a plunger arranged parallel with the crank pin, and means for automatically and periodically actuating the plunger to force lubricant from the reservoir to the crank pin.

3. A locomotive drive wheel having a lubricant reservoir positioned between two of the spokes thereof and a crank pin, and mechanism for force feeding lubricant to said crank pin, said mechanism being formed and positioned within the reservoir and including a part arranged parallel with said pin and adapted for actuation by engagement with another part of the locomotive as said wheel revolves.

4. A locomotive drive wheel, formed to provide a lubricant reservoir between at least two of its spokes, a crank pin carried by the wheel, and means for periodically force feeding lubricant from said reservoir to said crank pin, said means extending parallel with said crank pin.

5. A locomotive drive wheel, having spokes, plates fixed to opposite sides of at least two of the spokes to provide an enclosed lubricant reservoir, and means for periodically force feeding lubricant from the reservoir to the crank pin, said means extending parallel with said crank pin.

6. A locomotive drive wheel having a crank pin boss and a crank pin therein, means providing a lubricant reservoir positioned in said wheel adjacent the boss, said crank pin and boss having a passageway therein, a force feed device associated with said reservoir and including a part projecting beyond the same and to be automatically actuated during the revolution of the wheel, to operate the force feed device to force lubricant through the passageway.

7. A locomotive drive wheel embodying therein, means providing a lubricant reservoir, a crank pin carried by the wheel, there being a passageway leading from said reservoir to the crank pin, means in the reservoir providing a plurality of ports connected to said passageway, and a plunger operable from outside the reservoir for forcing lubricant farther along said passageway which enters said passageway through said ports.

8. A locomotive drive wheel, embodying therein, a crank pin boss and a crank pin therein, said boss and crank pin having a conduit therein, means providing a lubricant reservoir adjacent the boss, a member fixed to the boss within said reservoir and having a part parallel with the crank pin, said member having a passageway therein connected to said conduit and said part having lateral ports opening into the passageway, a spring pressed plunger with a stem on both ends, located in said part of said member, a casing carried by a fixed part of the wheel to receive said part of said member, one stem of the plunger entering said passageway to open up and close off said ports while the other stem projects through said casing and means for engaging said last mentioned end of the plunger to actuate the same.

9. In combination with a locomotive drive wheel having a crank pin, means providing a lubricant reservoir carried by said wheel, a rod journalled on the crank pin, and a force feed device associated with said lubricant chamber and adapted to be actuated by the rod during the revolution of the drive wheel.

10. In combination with a locomotive drive wheel having a crank pin, means providing a lubricant reservoir carried by said wheel, a rod journalled on the crank pin, and a force feed device associated with said lubricant chamber and including a plunger, and means on said rod adapted to engage the plunger to actuate the force feed device in the revolution of the wheel.

In testimony whereof, I have hereunto set my hand, this 20 day of April, 1926.

EDWARD J. BRENNAN.